(12) United States Patent
Salem

(10) Patent No.: US 11,017,123 B1
(45) Date of Patent: May 25, 2021

(54) SYSTEM FOR ANONYMIZING DATA FOR USE IN DISTRIBUTED LEDGER AND QUANTUM COMPUTING APPLICATIONS

(71) Applicant: Mores, Inc., Burbank, CA (US)

(72) Inventor: Ayman Salem, Burbank, CA (US)

(73) Assignee: Mores, Inc., Burbank, CA (US)

( * ) Notice: Subject to any disclaimer, the term of this patent is extended or adjusted under 35 U.S.C. 154(b) by 0 days.

(21) Appl. No.: 16/776,418

(22) Filed: Jan. 29, 2020

(51) Int. Cl.
- *G06F 21/64* (2013.01)
- *H04L 9/06* (2006.01)
- *H04L 9/08* (2006.01)

(52) U.S. Cl.
CPC ............ *G06F 21/64* (2013.01); *H04L 9/0643* (2013.01); *H04L 9/0852* (2013.01); *H04L 2209/38* (2013.01); *H04L 2209/46* (2013.01)

(58) Field of Classification Search
CPC ..... G06F 21/64; H04L 9/0643; H04L 9/0852; H04L 2209/46; H04L 2209/38
See application file for complete search history.

(56) References Cited

U.S. PATENT DOCUMENTS

| | | | |
|---|---|---|---|
| 2010/0027780 A1* | 2/2010 | Jung | G06Q 10/10 380/28 |
| 2018/0288005 A1* | 10/2018 | Brathwaite | G16B 15/00 |
| 2020/0035332 A1* | 1/2020 | Agrawal | G16B 50/00 |
| 2020/0067811 A1* | 2/2020 | Shah | G06F 16/212 |

FOREIGN PATENT DOCUMENTS

CN     110149200 A  *  8/2019

OTHER PUBLICATIONS

"Mathematical model for studying genetic variation in terms of restriction endonucleases," Nei et al., Proc. Natl. Acad. Sct. USA, vol. 76, No. 10, pp. 5269-5273, Oct. 1979.

* cited by examiner

*Primary Examiner* — Nelson S. Giddins
(74) *Attorney, Agent, or Firm* — Smyrski Law Group, A P.C.

(57) ABSTRACT

A system and methods for anonymizing data for distribution on a distributed ledger arrangement is provided. The design includes receiving initial data at a computing device, the initial data relating to an initiating party, removing, at the computing device, personal identifying information from the initial data, thereby creating personal identifying information scrubbed data, anonymizing the personal identifying information scrubbed data on the computing device using DNA processing, thereby creating DNA processed scrubbed data, and providing the DNA processed scrubbed data from the computing device to the distributed ledger arrangement.

19 Claims, 10 Drawing Sheets

SYSTEM FOR ANONYMIZING DATA FOR USE IN DISTRIBUTED LEDGER AND QUANTUM COMPUTING APPLICATIONS

BACKGROUND OF THE INVENTION

Field of the Invention

The present invention relates in general to distributed ledger applications, and more particularly to anonymization of data for distribution via distributed ledger applications, such as blockchain.

Description of the Related Art

Distributed ledger systems offer certain advantages for maintaining and allowing access to data. Such systems provide access to data on an on-demand basis, with minimal or zero risk of corruption or loss. One such distributed ledger system is blockchain, which has Bitcoin as its most well known application.

However, once the information is provided to the distributed ledger system, it is relatively permanent. This produces issues in many different fields, including but not limited to healthcare and the maintenance of patient records, but also in banking as well as other areas where privacy is desired. Optimally, the user or the party with the privacy concern would beneficially control distribution of the data. However, if the entity interested in privacy distributes or provides information to blockchain or another distributed ledger system, she loses control of that information, potentially forever.

Certain systems have been introduced to address this situation, but in general none of them offer an ability for the user, or the party with the privacy concern, to maintain a level of control over the information, such that the user can withhold the information provided and/or sell or otherwise exchange the information conditionally and/or for value. Thus different challenges arise with respect to personal data including but not limited to security, value, ownership, quality, structure, noise and other foreseen and unforeseen challenges.

As an example, healthcare related data is generated by the user/patient. For example, health, fitness, nutritional, cosmetic and pharmaceutical data may be generated, and the user/data generator may have an expectation that he owns the data. When a healthcare provider or an artificial intelligence (AI) agent receives and reviews this data, that entity may conceive of and create a care plan that has copyright protections and ownership of the underlying information used in creating such a plan. The execution of the care plan provides divided perceived ownership between user/patient and healthcare provider or AI agent. This data is individually and/or collectively valuable to certain third parties who would be willing to exchange a thing of value for this data. When third parties access data with personal identifiers, multiple security risks arise, and data generator consent is not always obtained by the third party. The data generator can be oblivious to how many times his data was exposed and reviewed by primary, secondary, tertiary, etc. parties. Such downstream distribution without data generator knowledge or consent can be highly undesirable.

Thus there is a need to provide a mechanism for a data generator or user to have control of data when placed on a distributed ledger system, such as blockchain. Such a design would beneficially provide a level of security and control in the hands of the data generator and would address issues associated with previous designs.

SUMMARY OF THE INVENTION

Thus according to one aspect of the present design, there is provided an apparatus Thus according to one embodiment of the present design, there is provided a method for anonymizing data for distribution on a distributed ledger arrangement, comprising receiving initial data at a computing device, the initial data relating to an initiating party, removing, at the computing device, personal identifying information from the initial data, thereby creating personal identifying information scrubbed data, anonymizing the personal identifying information scrubbed data on the computing device using DNA processing, thereby creating DNA processed scrubbed data, and providing the DNA processed scrubbed data from the computing device to the distributed ledger arrangement.

According to another embodiment of the present design, there is provided a method for interacting with data using a distributed ledger arrangement, comprising receiving initial data at a computing device relating to an initiating party, the initial data relating to an initiating party, removing, at the computing device, personal identifying information from the initial data, thereby creating personal identifying information scrubbed data, anonymizing the personal identifying information scrubbed data on the computing device using genetic processing, thereby creating genetic processed scrubbed data, and providing the genetic processed scrubbed data from the computing device to the distributed ledger arrangement.

According to a further embodiment of the present design, there is provided a method for interacting with data using a distributed ledger arrangement, comprising receiving initial data at a computing device relating to an initiating party, the initial data relating to an initiating party, removing, at the computing device, personal identifying information from the initial data, thereby creating personal identifying information scrubbed data, anonymizing the personal identifying information scrubbed data on the computing device using DNA processing, thereby creating DNA processed scrubbed data, and providing the DNA processed scrubbed data from the computing device to the distributed ledger arrangement. Once the DNA processed scrubbed data has been provided to the distributed ledger arrangement, a third party may retrieve the genetic processed scrubbed data from the computing device and deanonymize the genetic processed scrubbed data only when authorized by the initiating party.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

Figure 1:
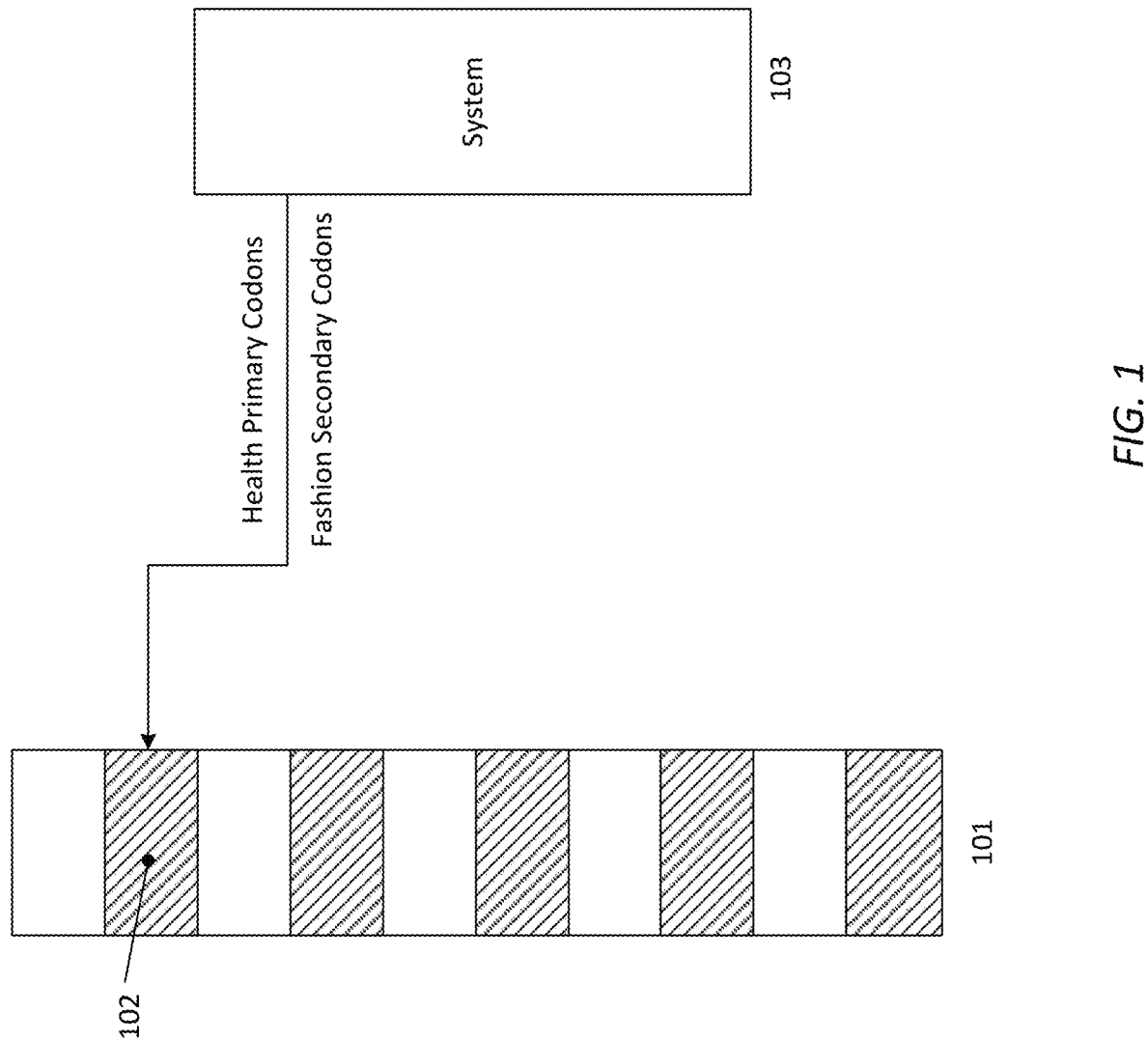
FIG. 1 illustrates a data locus as part of a health datasome.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The present design provides a system of data anonymization that anonymizes user data for later use once put on the blockchain. The present description includes blockchain processes for decentralized transactional banking processes of data including the disciplines of anonymization, de-anonymization, monetization, aggregation, real time manipulation and prediction, third party verification and securitization, accrual of royalty, unrestricted ownership and full transactability of banked data. While described with respect to banking and blockchain, it is understood that these systems, concepts, teachings and disciplines are not limited but may include other distributed ledger applicable fields, such as healthcare, real estate, governmental activities, and so forth, wherein the distributed ledger arrangement is a public or private mechanism other than blockchain.

The present system may be anonymized with "on demand" de-anonymization and user or content generator ownership of the data, with decentralized distributed ledger processes not limited to data securitizing, monetizing, sharing, transferring, bartering, donating, collimating with other data, accruing of royalty, and may include intellectual and copyright protection.

The present design in general receives information, anonymizes the information using genetic/DNA technology, where the genetic technology employed is not necessarily the genetic attributes of the individual from whom the data was collected but is unique and associated with that individual nonetheless, and the data may be morphed or reshaped and provided to a distributed ledger system, such as blockchain. All data provided is stripped of personal information, such as the name of the data provider, social security number, and so forth, with an ability to potentially contact the data provider at most provided. Data placed on the distributed ledger system may be retrieved in anonymous form, and the information decrypted based on the information known to the originator or owner of the data. Information including a value associated with the data may be provided with the data on the distributed ledger system, and the system includes an ability for a third party to request the data, anonymously, with the system querying the user for permission. Assuming permission is granted by the owner of the data, the system provides the data to the end user from the distributed ledger in decrypted form, according to the information provided by the party holding the rights to the data and by reversing the DNA or genetic sequence. In this manner, security of the data can be controlled by a single originating party who may exchange the data temporarily or permanently in for something of value or at his or her election, such as to release records to different providers. The present design may employ various combinations of genetic or DNA data anonymization and public/private key functionality.

While primarily discussed herein with respect to healthcare, the present system can be applied in any scenario employing distributed ledger systems, particularly wherein privacy for the originator of the data or a party owning the data is paramount.

Thus in general, the present design deals with data transactions in an anonymized environment. The advantages of using distributed ledger technology are greater transparency, enhanced security, improved traceability, increased efficiency and speed, as well as reduced costs. The main advantage of a distributed ledger system is that of trust. User identity remains confidential, and all users can deal freely through the secure network. Anonymity and transaction security are also advantages of distributed ledger technology. With respect to privacy and anonymity, these attributes are of great value in healthcare transactions. Current solutions call for a healthcare provider to offer multiple personal identifiers, including identifiers to match a requested service or good to the patient/user. Such identifiers are generally provided to avoid identification mistakes that can lead to medical errors. Identifier data may be readily accessible to healthcare workers in different healthcare related and non-related organizations. Bad actors, such as ex-employees or hackers, can maliciously use these personal identifiers for financial gains or other misdeeds. The present system provides an anonymized data environment with reliable processes for data anonymization and scrubbing of personal identifiers, automated verification of identity, data deanonymization excluding personal identifiers, automated consent to access anonymized data, data aggregation and monetization in an anonymized environment, real-time anonymized data manipulation and prediction, third party verification and securitization, accrual of anonymized data royalty, anonymized data co-localization, and safeguards against quantum computing. The advent of quantum computing may jeopardize the integrity of public-key cryptography and the premise of distributed ledger immutability.

In one aspect, data may be generated using an interactive diary, such as that shown in U.S. Pat. No. 9,838,508, inventor Ayman Salem, issued Dec. 5, 2017, the entirety of which is incorporated herein by reference. Data generated by such an interactive diary may be written to blockchain and the individual may be encouraged with a reward system, such as a system employing HPs (Health Points) and DPs (Disease Points), also called HIPs and DIPs, in accordance with U.S. patent application Ser. No. 15/943,585, filed Apr. 2, 2018, inventor Ayman Salem, the entirety of which is incorporated by reference. Both data and cryptocurrencies or items of value (HPs and DPs) are saved in user accounts on blockchain for the user/patient and/or provider, whether healthcare or otherwise. The system may employ data collection according to any reasonable means, including but not limited to data collection methods in the aforementioned patent and application but also in a contactless manner such as is described in U.S. patent application Ser. No. 16/027,352, filed Jul. 4, 2018, inventor Ayman Salem, the entirety of which is incorporated herein by reference.

The present device may employ anonymization in association with blockchain, anonymizing the information maintained thereon. In general, anonymization or deanonymization in the present design has similarities to the chromosomal DNA system, where DNA in humans is a double helix. The system employs a form of morphing based on nucleotide science, also referred to herein as genetic or DNA processing, mapping, or morphing.

Each helix of chromosomal DNA is made of a "sugar-phosphate" backbone with "base pairs" for each double helix. A nucleotide is the basic structural unit and building block for DNA. These building blocks are hooked together to form a chain of DNA. A nucleotide is composed of three parts: five-sided sugar, phosphate group, and nitrogenous base (nitrogen containing).

The sugar and phosphate group make up the backbone of the DNA double helix, while the bases are located in the middle. A chemical bond between the phosphate group of one nucleotide and the sugar of a neighboring nucleotide holds the backbone together. Chemical bonds, i.e. (hydrogen bonds, between the bases across from one another hold the two strands of the double helix together. Four types of bases exist in DNA, namely Adenine (A), Cytosine (C), Guanine (G), and Thymine (T).

An allele is a variant form of a gene. Some genes have a variety of different forms, which are located at the same position, or genetic locus, on a chromosome. Humans are called diploid organisms because they have two alleles at each genetic locus, with one allele inherited from each parent. Each pair of alleles represents the genotype of a specific gene. Alleles contribute to the organism's phenotype, which is the outward appearance of the organism. Alleles may be dominant or recessive. Alleles can also refer to minor DNA sequence variations between alleles that do not necessarily influence the gene's phenotype.

The allele frequency represents the incidence of a gene variant in a population. Alleles are variant forms of a gene that are located at the same position, or genetic locus, on a chromosome. An allele frequency is the number of times the allele of interest is observed in a population divided by the total number of copies of all the alleles at that particular genetic locus in the population. Allele frequencies can be represented as a decimal, a percentage, or a fraction, and represent a numeric quantity of genetic diversity. Changes in allele frequencies over time can indicate that genetic drift is occurring or that new mutations have been introduced into the population.

In the present design, in one embodiment, the phosphate group may represent GPS location while the sugar group may represent time. The nucleotide bases represent the paired data points. For example, heart rate is paired with one or more relevant data points specific for that condition. For example, in a condition such as anemia, the two paired data points may be heart rate and hemoglobin count. Other alleles can exist pertinent to the same individual utilizing other relevant data points such as heart rate and mean corpuscular volume of red blood cells and so forth.

A nucleotide is the basic structural unit of human DNA and is formed of sugar-phosphate-nitrogenous base. In the present system, a nucleotide is equivalent to a codon, wherein a codon is constructed of a GPS-time-data point. These codons, or data codons, written on blockchain are anonymized. The system may employ deep machine learning and/or quantum computing methodology to predict the change between the actual reading and the predicted reading based on equations such as those shown in "Mathematical model for studying genetic variation in terms of restriction endonucleases," Nei et al., Proc. Natl. Acad. Sct. USA, Vol. 76, No. 10, pp. 5269-5273, October 1979, the entirety of which is incorporated herein by reference. As used herein, such processing is referred to as genetic or DNA processing of personal information scrubbed data.

In the present design, each codon starts with GPS-time, and then employs pertinent data point(s) with associated alphanumeric codes at predetermined intervals on the specific datasome, where a datasome is the ongoing sequential accumulation of different data codons. For example, a DNA sequence may be created, such as TCGTTATCAG . . . representing a genetic or DNA sequence, and that sequence applied to the data. The randomization of alphanumeric code happens on blockchain by customary and/or quantum computing. Two steps are employed in verification. First unlocking the "Geo-located" alphanumeric code on the desired datasome; second, pairing of codons. Morphing calls for by assigning random alphanumeric codes and/or code parts from other codons on other datasomes, like having parts of financial codons appended to or provided to a Health datasome, and so forth.

Assertive synchronization between different datasomes is authorized by the user via any of the agreed upon authorization methodologies available. An example is a user visiting a doctor, the doctor identifies the user using a Health Datasome (HD). The system morphs the user's HD, and additional blocks may be added in multiple dimensions by the doctor, and the user approves the changes to their HD. An assertive synchronization event is approved by the user between their HD and Financial Datasome (FD) for the doctor to be compensated and the system may further morph both HD and FD with a financial component, and the system saves the newly morphed Health Datasome Codon (HDC) and Financial Datasome Codon (FDC) on blockchain.

The user is identified by the doctor or other appropriate personnel before the visit via a de-anonymization process, authorized by the patient. At the end of the visit, the doctor or other appropriate personnel or entity generates a new data point with GPS and time stamps. The patient then approves the addition of a block or multiple blocks to his health datasome with the option of additional morphing of data points. For example, if he had a co-pay for the doctor's visit, he can use "fraction of cents" or "last four digits of credit card number" or any other piece of relevant financial information to "Morph" his Health codons for that visit. He can also morph it by relevant other information, e.g. fashion information like "what color shoes" he or she were wearing during the visit.

Authorization occurs to verify identity for the encounter and or addition of codons on one's datasome on blockchain, also authorization occurs to pay for goods and/or services. The system may employ public/private key technology to initiate the authorization process i.e. to obtain consent from the user to start the process of verification to receive the service, pay for service or goods, share de-identified information, add codons, morph codons and other data related processes pertaining to the individual.

Different data points may be employed in the system other than healthcare data points, such as diet, fitness, fashion, and nutrition.

The system of data anonymization employed herein may have multi-helices where the sugar-phosphate backbone is replaced by a "GPS-Time" backbone for the different datasomes, where a datasome is a chromosome of data employed in the current design. In the datasomes of the present design, "bases" are represented by the individual data point, such as vital signs and/or other health and medical related de-identified data points, co-localized with GPS location and time for the health datasome. The system performs de-anonymization after obtaining authorization from the user and can reveal personal identifiers, or simply the "pairing" of random data points similar to "base pairing," which can verify the concealed identity of that individual without revealing any personal identifiers. The system saves the de-identified data points pairing sequentially as a data footprint for the individual on a permissioned and/or permissionless blockchain. The system may use a few hundred or few thousand random data points for verification and distribution across the network, facilitating scaling.

The system converts, or morphs, collected data points into different distinctive structural formats that serve different functional roles. An example would be five different individuals with a heart rate of 90, representing an increased heart rate. One individual reaches a heart rate of 90 because of brisk walking, another individual had a heart rate lowering medication to bring heart rate down to 90, a third individual suffers from anemia causing him to have an elevated heart rate, a fourth individual lost some blood that caused his heart rate to be at 90, while the fifth individual became anxious and his heart rate reached 90. This shared single data point (heart rate 90) shared amongst all five individuals takes five distinctive three-dimensional structures that are different and totally exclusive for each one of those five individuals. If Global Positioning System (GPS) location, date and time stamps are added to such events, the situation exhibits a more unique identifier for each of these individuals as they uniquely exist in the space-time continuum without overlap. In the event that GPS localization fails to uniquely identify an individual, then the sequential GPS identifiers with date and time stamps can be used by the system, equivalent to the genomic sequence on a chromosome identifying an individual.

Thus different datasomes (data chromosomes) written to the blockchain are created to identify a user or individual, specific to certain circumstances, interactions and/or transactions. As examples, a "health datasome" (HD) can be used as an identifier for health interactions, a "sports datasome" (SD) can be used for sports interactions, a "nutritional datasome" (ND) can be used for nutritional interactions, a "financial datasome" (FD) can be used for financial interactions and so on and so forth. Each datasome carries an intrinsic "transactional value" written and reconciled on blockchain, either permissioned or permissionless. For example, a healthy individual having a certain intrinsic value, e.g. 10× in their HD and possibly less or more in their other datasomes depending on accrual systems employed.

In the present system, assertive synchronization between different datasomes is authorized by the user using a desired authorization methodology. An example would be a user visiting a doctor and the doctor identifying the user using HD, e.g. time of day, GPS location, etc. The system morphs the user's HD, and the system or doctor may add blocks in multiple dimensions. The user may approve changes to her HD. The user may approve an assertive synchronization event between her HD and FD for the doctor to get paid, for example, providing both healthcare and financial information together. The system may morph both HD and FD and the newly morphed HDC and PDC saved on blockchain. The system thus receives information related to a person, entity, transaction, morphs the information received a discussed below, and the morphed information is provided to blockchain, with the possibility of multiple morphings occurring in series or in parallel.

An example of a health datasome (HD) illustrates how datasomes are built on blockchain specific for the user and operation is similar for other datasomes (SD, ND, FD, etc.) using pertinent data points written on blockchain for each corresponding data codon (sequential coding blocks).

"Health datasomes" (HD) are encoded data sequences unique for any user, with a structure based on sequential coding of different elements, such as time (year, month, date, hour, minute, second), GPS coordinates (latitude, longitude and elevation), speed of the body of the user, human body anthropometric attributes (height, weight, eye color, hair color, body habitus, scars, moles, walking pattern, hand movements, certain facial gestures, etc.), human body vital signs of the user (including but not limited to: temperature, heart rate, blood pressure, respiratory rate, skin blood diffusion color, pupillary size, oxygen saturation, body weight, etc.), human body laboratory values of the user (including but not limited to blood glucose level, complete blood count, complete metabolic, hormonal, enzymatic and bacterial assays, etc.), human body radiological and/or radiographical findings (including but not limited to X-rays, CT scans, MRI, ultrasound, nuclear medicine, etc.), and human body disease symptoms and signs (including but not limited to: General: anorexia, weight loss, cachexia, chills and shivering, convulsions, deformity, discharge, dizziness/Vertigo, fatigue: malaise or asthenia, hypothermia, jaundice, muscle weakness, pyrexia, sweats, swelling, swollen or painful lymph node(s), weight gain, Cardiovascular: arrhythmia, bradycardia, chest pain, claudication, palpitations, tachycardia, Ear, Nose and Throat: dry mouth, epistaxis, halitosis, hearing loss, nasal discharge, otalgia, otorrhea, sore throat, toothache, tinnitus, trismus, Gastrointestinal: abdominal pain, bloating, belching, bleeding, constipation, diarrhea, dysphagia, dyspepsia, fecal incontinence, flatulence, heartburn, nausea, odynophagia, proctalgia fugax, pyrosis, Rectal tenesmus, steatorrhea, vomiting, Integumentary Hair: alopecia, hirsutism, hypertrichosis, Nail: clubbing, onycholysis, koilonychia, Skin: abrasion, anasarca, bleeding into the skin: petechia, purpura, ecchymosis and bruising, blister, edema, itching, Janeway lesions and Osler's node, laceration, rash, urticaria Neurological: abnormal posturing, acalculia, agnosia, alexia, amnesia, anomia, anosognosia, aphasia and apraxia, ataxia, cataplexy, confusion, dysarthria, dysdiadochokinesia, dysgraphia, hallucination, headache, akinesia, bradykinesia, akathisia, athetosis, ballismus, blepharospasm, chorea, dystonia, fasciculation, muscle cramps, myoclonus, opsoclonus, tic, tremor, insomnia, Lhermitte's sign, loss of consciousness, syncope, neck stiffness, opisthotonos, paralysis and paresis, paresthesia, prosopagnosia, somnolence, Obstetric/Gynecological: Last menstrual period, abnormal vaginal bleeding, amenorrhea, infertility, painful intercourse, pelvic pain, vaginal discharge, Ocular: amaurosis fugax and amaurosis, blurred vision, Dalrymple's sign, double vision, exophthalmos, mydriasis/miosis, nystagmus, Psychiatric: amusia, anhedonia, anxiety, apathy, confabulation, depression, delusion, euphoria, homicidal ideation, irritability, mania, paranoid ideation, phobia, suicidal ideation, Pulmonary: apnea and hypopnea, cough, dyspnea, hemoptysis, pleuritic chest pain, sputum production, Rheumatologic: arthralgia, back pain, sciatica, Urologic: dysuria, hematospermia, hematuria, impotence, polyuria, retrograde ejaculation, strangury, urethral discharge, urinary frequency, urinary incontinence and urinary retention, etc.)

The advantages of having separate datasomes as identifiers instead of personal identifiers such as name, age, address, social security number, driver's license number, etc. are in the area of privacy. Having separate identifiers using datasomes written in blockchain for different specific interactions further protects from quantum computing potential unraveling of securitized blockchain data blocks, hence the datasomes represent the overall topographic map without the nomenclature of the geography, making hacking or improper capture of such information virtually impossible, inhibiting identification of users without consent.

In the present blockchain arrangement, user identifiers/information are part of the individual account of the user. The user can grant access to any other user to show his account details.

The present design uses a key-pair (public/private), where the system attaches the key pair to every user account. If Yasir wants to see Bhaskar's information on the app, Yasir sends a request to Bhaskar to share the details. Yasir shares his public key with Bhaskar together with a request to allow information on this public key.

When Bhaskar allows access, he grants Yasir the ability to view account details, including HDs and other information on his account. User details are passed via API endpoint to the system server to provide the access information to the blockchain. Access request and approval are separate APIs. User details can be as simple as dictionary/json objects or as complex as randomized quantum computing methodology.

Thus third parties can access the anonymized data, such as via a secure node. Users can be offered incentives to provide access to user data, but in all instances the user is in control of releasing his or her data, or granting access, to third parties. The system may employ a data generator that decides if his/her data can be further released by the third party, such as in exchange for a benefit.

The system may use data aggregation techniques. The system may employ data aggregation in the data generator account in structured, unstructured or a combination format. The data generator may obtain 2D, 3D, or holographic data aggregating and converting tools to process and clean his/her data and convert such data from unstructured to structured or vice versa. The system can employ data generators to mine raw data for any specific reason, such as seeking to increase the value of the raw data. An example would be an unreported side effect of a pharmaceutical or chemical agent that can be negated by a certain action such as avoiding the sun or ingesting a certain food. Data generators may mine data related to the pharmaceutical or chemical agent and may make this determination or assessment, and certain third parties may potentially have an interest in such a finding.

The system may also perform real time data manipulation and prediction. Prediction models may be employed wherein data flow is set to accrue more data when available or provide real time access to data being collected and assessed. Such functionality may provide an ability to create and employ real time prediction models, either physiologic or pathologic, based on and for the generated data using any reasonable time frame, such as seconds, minutes, hours, days, weeks, months or years. The system may utilize or employ omissions of data or data manipulation in fine tuning the modeling in order to provide more accurate and realistic models.

The system may further employ third party data verification and securitization. The system may include a data generator that may refer to or employ third party verification of the raw data collected for quality control. One example is collecting body weight data from a scale for an obesity management program. The system data generator may subscribe to a third party data quality control program, such as via an API or an embedded tool in the scale used to weigh the patient, that assesses the quality of data generated and verifies the anonymized data is attributed to the same data generator without compromise of personal identifier information.

The system may also employ the accrual of data royalties. For an entity such as a healthcare provider or a fashion or cosmetic provider, the system may generate a care plan for a specific user need. Such care plan is specific to the care provider regardless of the raw data points the system uses to reach that proprietary care plan. If other providers or other third parties seek to use that proprietary output by the provider to train an artificial intelligence agent or for any other purpose, the provider can accrue points or royalty values or otherwise anonymously without revealing any personal identifiers. Different providers can aggregate their knowledge base and protect their collective information pertaining to care plans, designs, color combinations, fabrics, and so forth. Thus a third party provider seeking to obtain certain information may build up credit and may redeem that credit for anonymized information when authorized, where the information obtained contains no personal information.

The current system provides for unrestricted data ownership. Data generation is a primary requirement for data ownership under decentralized blockchain data management and banking processes using anonymized data. In other words, data generated is intended to be owned not by the underlying entities from which the data is collected, but rather the entity that collects and analyzes or otherwise processes the data. Ownership of data may be apportioned amongst users and providers based on agreed upon rules and regulations that may vary amongst user/providers communities. A record is kept on blockchain to anonymously trace data generation, as well as the transfer, lease, selling, acquisition or any other process related to anonymization of the underlying data.

Generated data are fully transactable and exchangeable with different cryptocurrencies, legal tender currencies and/or different rewards. Anonymized data can have different grades for the same class of data and value varies depending on free market conditions. The system may include a data exchange for different interested third parties to solicit anonymized data from data generators on blockchain. The value of a "block" of data on blockchain can vary based on certain attributes and market conditions.

In operation, user interaction with the device may entail the collection of data retained at the device, with data provided from modules to the device via WiFi, Bluetooth, or through a USB connection or by any other means known in the art. The processor at the device may process the data and may format the data into graphs, charts, diagrams, virtual assistants and other forms to be displayed to the user via, for example, the device (2D, 3D, or holographic) screen. The data and/or information may be controlled by the user and may be sent from the device, such as a drone, to a remote location, i.e. a virtual "cloud," where the information may be collected, analyzed, and/or stored. Once the system transmits user information to the remote devices, such user information may be maintained, analyzed, and specific user recommendations or information transmitted back to the user.

The system may provide varying levels of service. As one example, the system may provide a gold/silver/bronze level of service, wherein bronze is simply maintaining data at a remote site, silver is analyzing data and providing recommendations, and gold is a concierge type service where the user may be provided contact with available personnel (physicians, pharmacists, personal shoppers, cosmetics specialists, optometrists, dentists, etc.) and particular needs will be addressed. Different or alternate levels of service may be provided.

The system may be generally understood according to the following Figures. FIG. 1 illustrates the concept of a data locus that is a data block on a distributed ledger system, such as blockchain, that includes multiple data codons. Health datasome 101 is shown with data locus 102, where data locus 102 includes health primary codons and fashion secondary codons in this example. In this example, a patient/healthcare interaction occurs, which may be in person or not face to face, such as over the phone or internet. The system generates health primary codons and once approved, provides such codons to the blockchain. The Health datasome is combined or morphed with a secondary fashion codon on a specific data locus. As an example, the user may have an MRI and the results of the MRI may be combined or morphed by a specific fashion locus, which may be anything fashion related, such as what the user is wearing that day or a piece of clothing he identifies.

Figure 2:
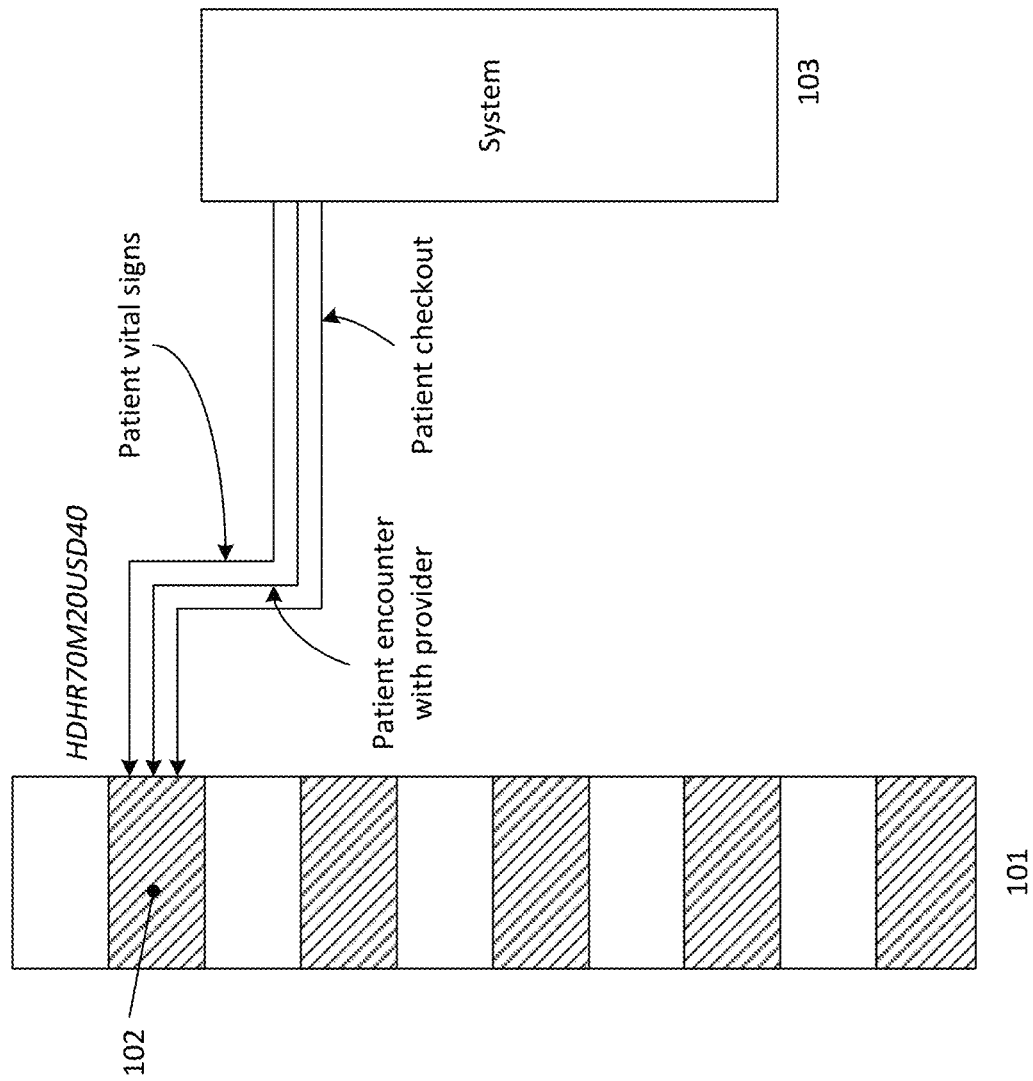
FIG. 2 shows data mapping to the health datasome.

FIG. 2 shows data mapping and nomenclature, wherein the system 201 generates three sets of actions based on user-provider interaction. First, the system records user vital signs, second the system records the user's encounter with the healthcare provider, such as date, time, and GPS location of the encounter, and the system records the user's checking out from the encounter. The mapping of the region or encounter may be randomly established according to healthcare provider protocol, such as date, time, GPS location, examination room number, or otherwise, and the system may record attributes such as heart rate 70, 20 minute encounter on Tuesday Jan. 7, 2020 at 1:47 pm, and the system may assign a value equivalent, such as S40. Such a determination may be assigned by the healthcare provider with a value of HDHR70M20USD40, which may be further anonymized and processed or morphed using a secondary codon, such as fashion, and a blockchain hashtag. As shown in FIG. 2, the system 103 then transmits the three pieces of information, anonymized and morphed, to blockchain including health datasome 101 and data locus 102. In this manner, the information is anonymized and randomized based on a provider or user provided piece of information. As a result, the user or provider may retain control of the information, only allowing de-anonymization at her or its pleasure.

Figure 3:
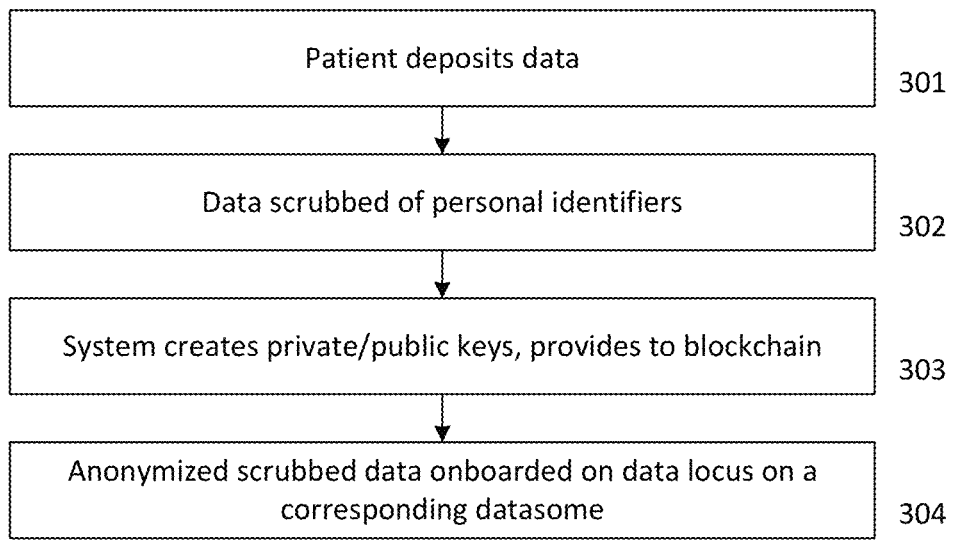
FIG. 3 is a flowchart representing anonymization of data provided.

FIG. 3 shows the general operation of anonymization of data. At point 301, the user deposits data with the system. At point 302 the system scrubs the data of personal identifiers, including but not limited to name and social security number. At point 303, private and public keys are created for the entity having original control and those keys are provided to block chain. For a user retaining his test results, the user is typically the entity having original control. For a healthcare provider, such as a doctor or hospital, who creates data based on patient data, such as a report summarizing attributes of multiple patients, the healthcare provider may be the entity having original control of the report while the patient may have control of the underlying data. Keys are distributed accordingly at point 303. At point 304, the system places the anonymized scrubbed data on the data locus on a corresponding datasome.

Figure 4:
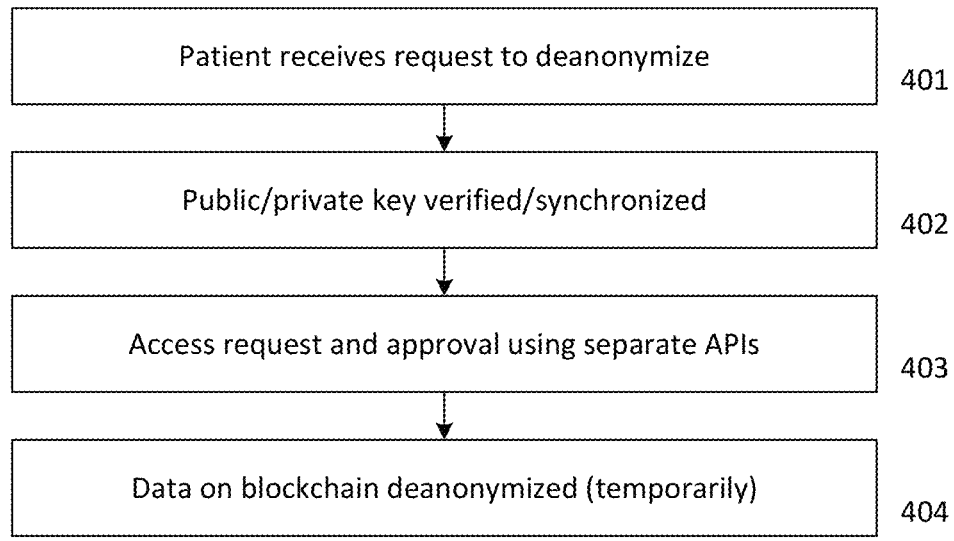
FIG. 4 is a flowchart illustrating deanonymization of data.

FIG. 4 illustrates deanonymization of data. From FIG. 4, the user receives a request to deanonymize data, via contact information for the user provided with the anonymized data. In general, the user may be assigned a unique identifier, typically by the system but possibly by the institution or even by the user, and this information may be selectively employed from the blockchain to provide a request to deanonymize data, and an entity requesting deanonymization may be provided. Such information is provided to a repository that correlates the unique identifier identifying the user with the current contact information of the user, which may be updated. As a very simple example, the healthcare facility may be assigned number 010101 while the patient my be assigned the number 1234, and thus the 0101011234 value may be provided to blockchain. When a request to deanonymize is provided by the system, the repository receives the request and contacts the user. Sufficient security to the repository is provided and in some instances may be provided on the blockchain. Point 402 shows the system verifying and/or synchronizing public and private key information, an alternate method of verifying the user. Once the user, or entity holding the confidentiality, is contacted, the user may agree to access to the information, in one instance in exchange for value. Point 403 calls for access request and approval using separate APIs for each. Once approved and access protocols are followed, the system deanonymizes the data and provides the data to the requestor at point 404. Such anonymization and deanonymization can facilitate the transfer of monies as well as allowing access to care providers more readily than current methods. For example, if the user is injured in a remote location from her primary care physician, the physician at the remote location can request access and the user can provide access quickly and easily. Point 404 deanonymizes and provides the information from the system to the approved requestor.

Figure 5:
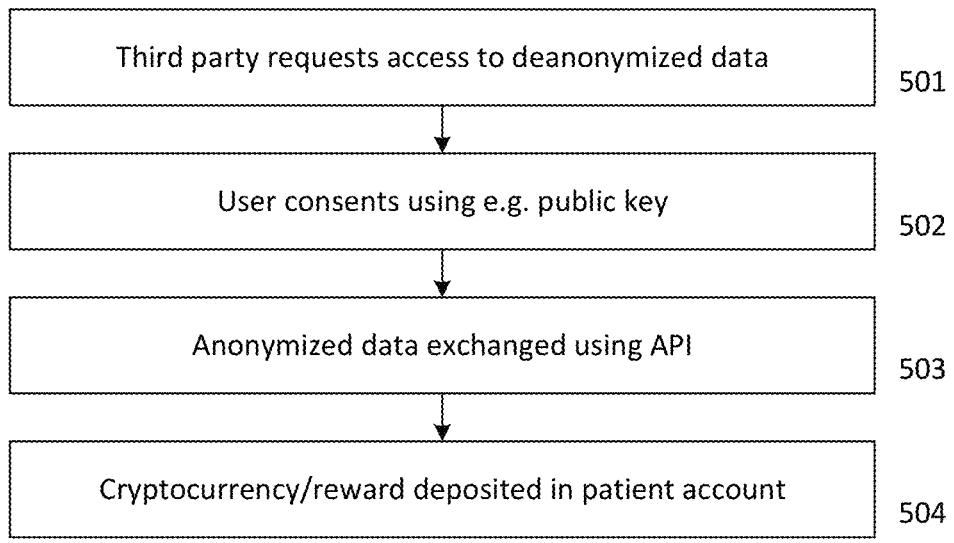
FIG. 5 shows the monetization of anonymized data.

FIG. 5 shows how such data can be assigned a value and the value exchanged for access to the data. At point 501, a third party requests access to deanonymized data. The data may have a value preassigned to it, or the owner and requestor may negotiate, via the system, a value for exchange. At point 502, the user consents using his public key only, but in this example not his private key. Consent may be provided in other ways, including via public and private key exchange, a system of approval and/or for entering negotiation, or otherwise. Once the requestor has been given the public key or other means of approval, the system provides anonymized data value, such as anonymized data points or monetary value, or some other thing of value from the requestor to the data holder via API at point 503. At point 504, the thing of value is provided to the entity holding rights in the data, i.e. the entity that approved the transaction for the value.

Figure 6:
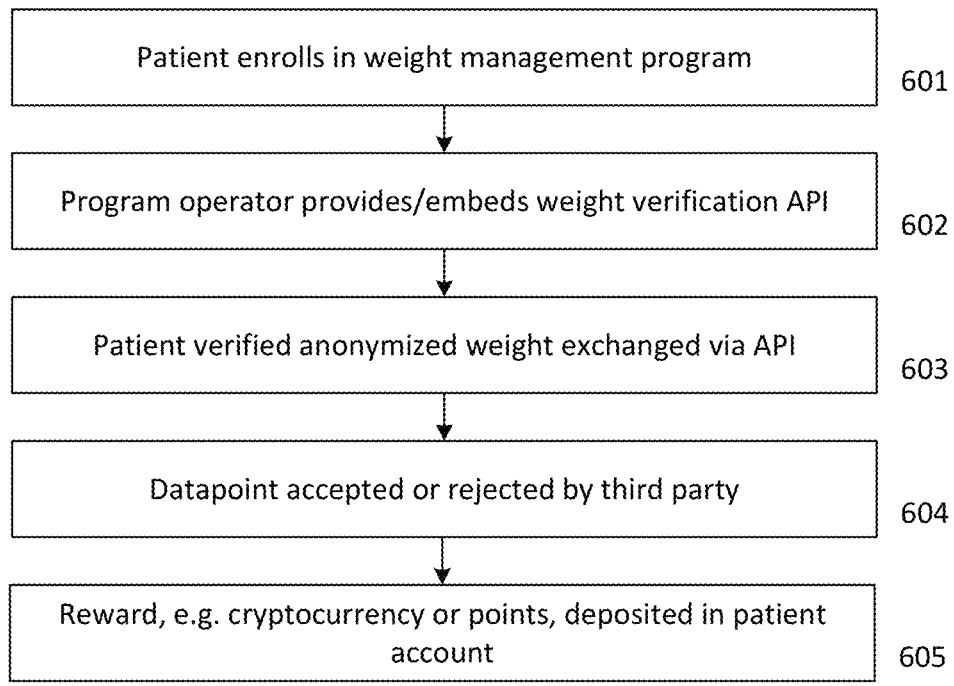
FIG. 6 is a flowchart of third party data verification.

FIG. 6 generally represents third party data point verification. The example of FIG. 6 involves a weight management program. At point 601, the user enrolls in a weight management program. At point 602, the program operator embeds a weight verification API. At point 603, the system verifies an anonymous weight level is exchanged via API. At point 604, the data point may be accepted or rejected by the third party, while at point 605 the cryptocurrency or reward may be deposited into the patient's account. This provides an exchange of confidential information without compromising the confidential information and provides the user with an incentive to provide the confidential information.

Figure 7:
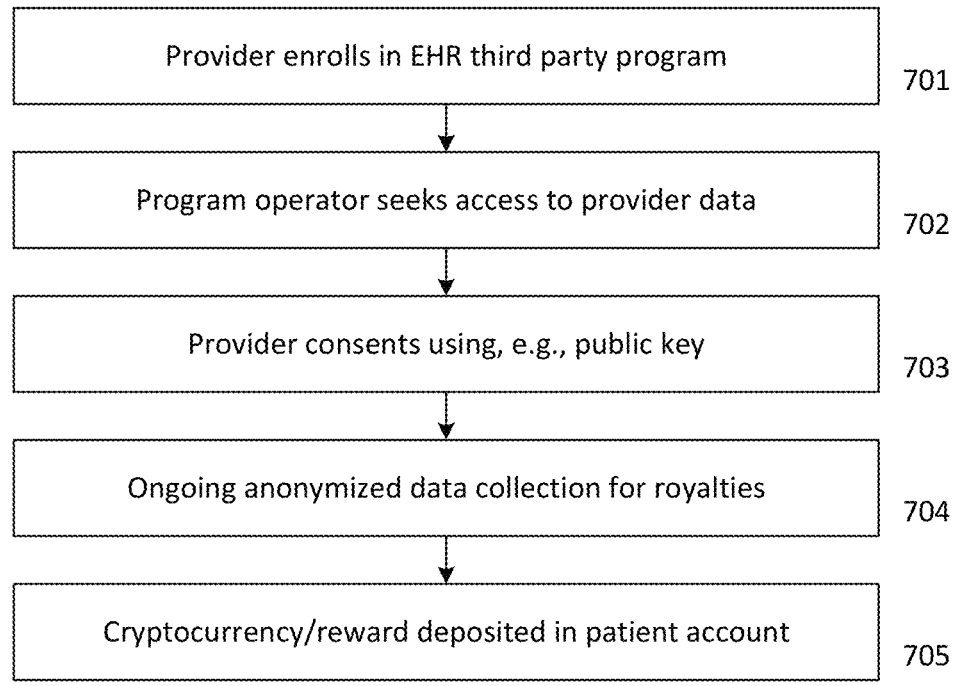
FIG. 7 shows accrual of anonymized data values, such as a royalty or reward.

FIG. 7 shows the accrual of loyalty points on the system. From FIG. 7, the physician may enroll in an EHR (Electronic Health Record) third party program. At point 702, the program operator may request access to the physician's data. At point 703, the physician may consent using her public key, while at point 704 data collection for royalties occurs, where the data collection includes anonymized data. At point 705, the system may allocate value, such as cryptocurrency, points, or currency or some other reward, to the user or data holder's account. In this manner, the physician can provide data and additional data can be sought using incentivization, thus providing significant amounts of data as desired and obtainable.

Figure 8:
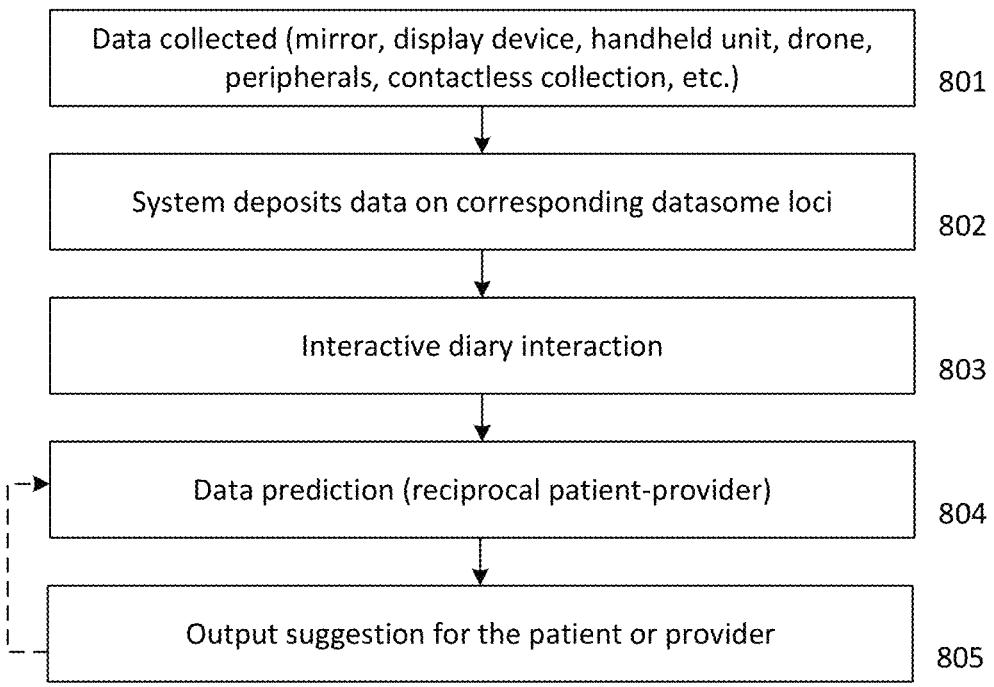
FIG. 8 is a flowchart of anonymized data point collection.

FIG. 8 shows anonymized data point collection, wherein at point 801, mirror, display device, handheld unit, drone, peripheral, contactless evaluation device, or other device collects data from the patient. At point 802, the system deposits the data collected on loci on a corresponding datasome. Point 803 shows the example of an interactive diary interacting with an AI agent or human to collect further data, such as the food the patient is eating, the exercise the patient is getting, and so forth. Point 804 is a general prediction loop, seeking to predict needs or attributes of the patient, where the data prediction loop in one instance is a reciprocal user-provider data prediction loop. Such a data prediction loop seeks for the system to predict a need or an action by the user, such as a desired action, and providing that action to the user, whereupon the user may accept the need or perform the action, and may inform the system. The system may then make a further prediction, such as the user is ignoring the suggestion to ride his bicycle, so instead the system recommends decreasing food intake or a different form of exercise. Positive feedback and encouragement or points or a thing of value may be provided to incentivize the user. Point 805 calls for the system to make at least one suggestion for the user or provider, and an optional feedback path is shown.

Figure 9:
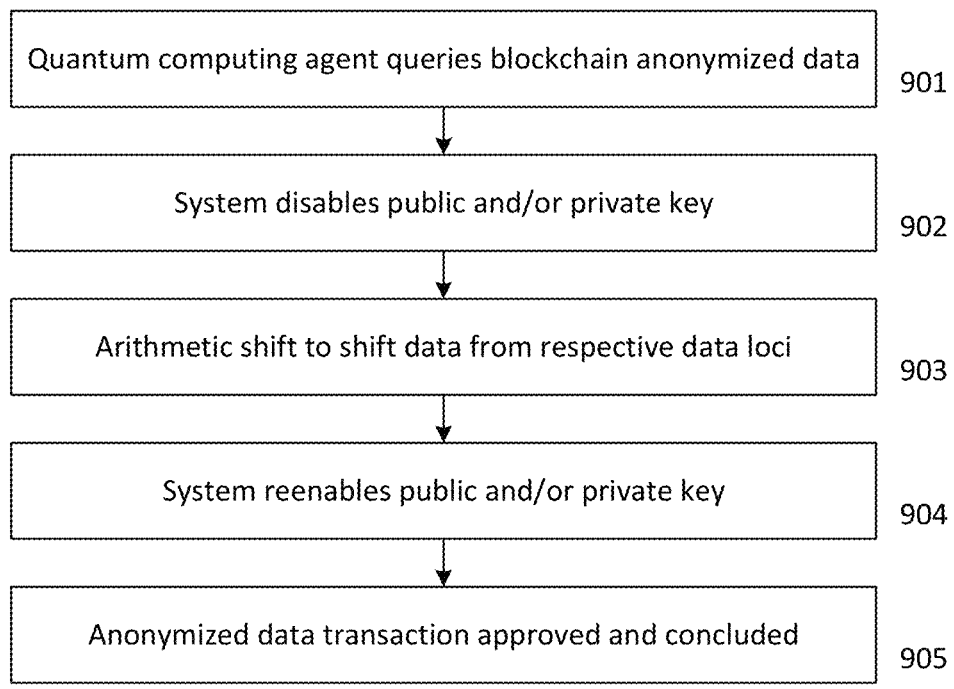
FIG. 9 is a flowchart of an arithmetic shift to safeguard against quantum computing hacking.

FIG. 9 illustrates a blockchain anonymized data arithmetic shift to safeguard against intrusion or hacking. From FIG. 9, the system employs a quantum computing agent that queries blockchain anonymized data at point 901. At point 902, the system disables public and private key functionality. Point 903 calls for the system to employ arithmetic shift to shift data from their respective data loci, while point 904 reenables public and private key functionality. Point 905 approves and concludes the anonymized data transaction.

Figure 10:
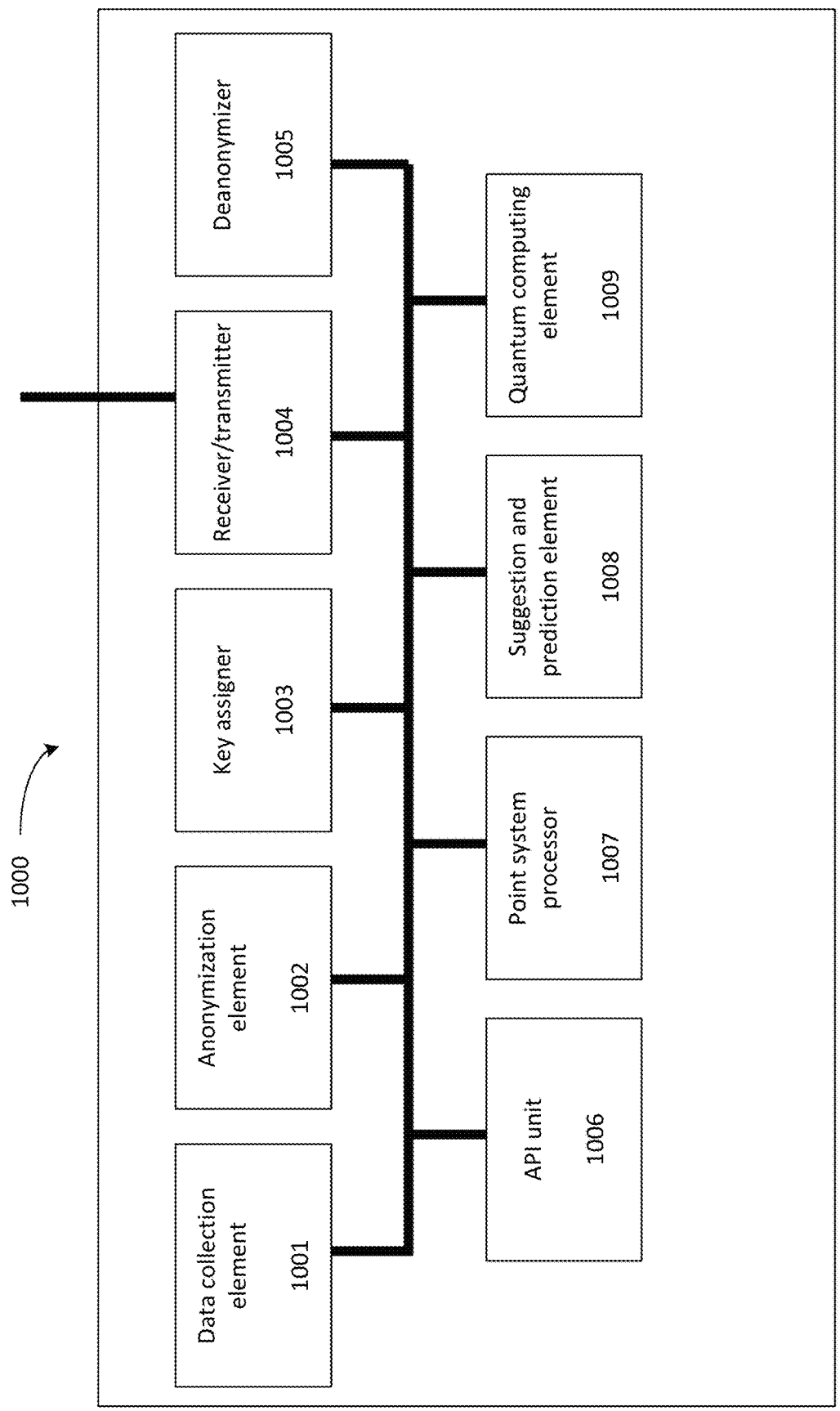
FIG. 10 is a general overview of an embodiment of the present design.

FIG. 10 is a general overview of the system including the functionality discussed. FIG. 10 may employ a combination of hardware and software but the functionality represented may be employed. Less or more than is shown in FIG. 10 may be employed in a system according to the current teachings, and some of the functionality may be provided on different components or at different locations. From FIG. 10, there is provided system 1000, including a data collection element 1001 that may collect data in any form via receiver/transmitter 1004. Data collection element 1001 may provide data to anonymization element 1002 which anonymizes the data, such as according to the genetic anonymization discussed herein. Anonymization element may scrub the information of personal data. Key assigner 1003 assigns public and private keys, and receiver/transmitter 1004 transmits the anonymized data to blockchain or appropriate public or private distributed ledger arrangement.

Deanonymizer 1005 receives a user request to deanonymize data and employs key assigner 1003 or other appropriate key verification objects to synchronize or verify key attributes. Again, public and private keys are discussed here, but other security measures may be provided to verify the entity requesting deanonymization. API unit 1006 provides necessary APIs for incoming and outgoing processing. Point system processor 1007 is shown to provide ability for the user to obtain value for allowing access to the information, whether by points, cryptocurrencies, or other items of value. Point system processor 1007 may perform at least some of the functionality show in in FIGS. 6 through 8, including offering an ability to negotiate value, to award points for permitting access to data, searching for additional data when requested, and so forth. Suggestion and prediction element 1008 provides for providing the user with suggestions based on individual performance and needs of the patient in question. Quantum computing element 1009 performs the functionality of FIG. 9.

Figure 11:
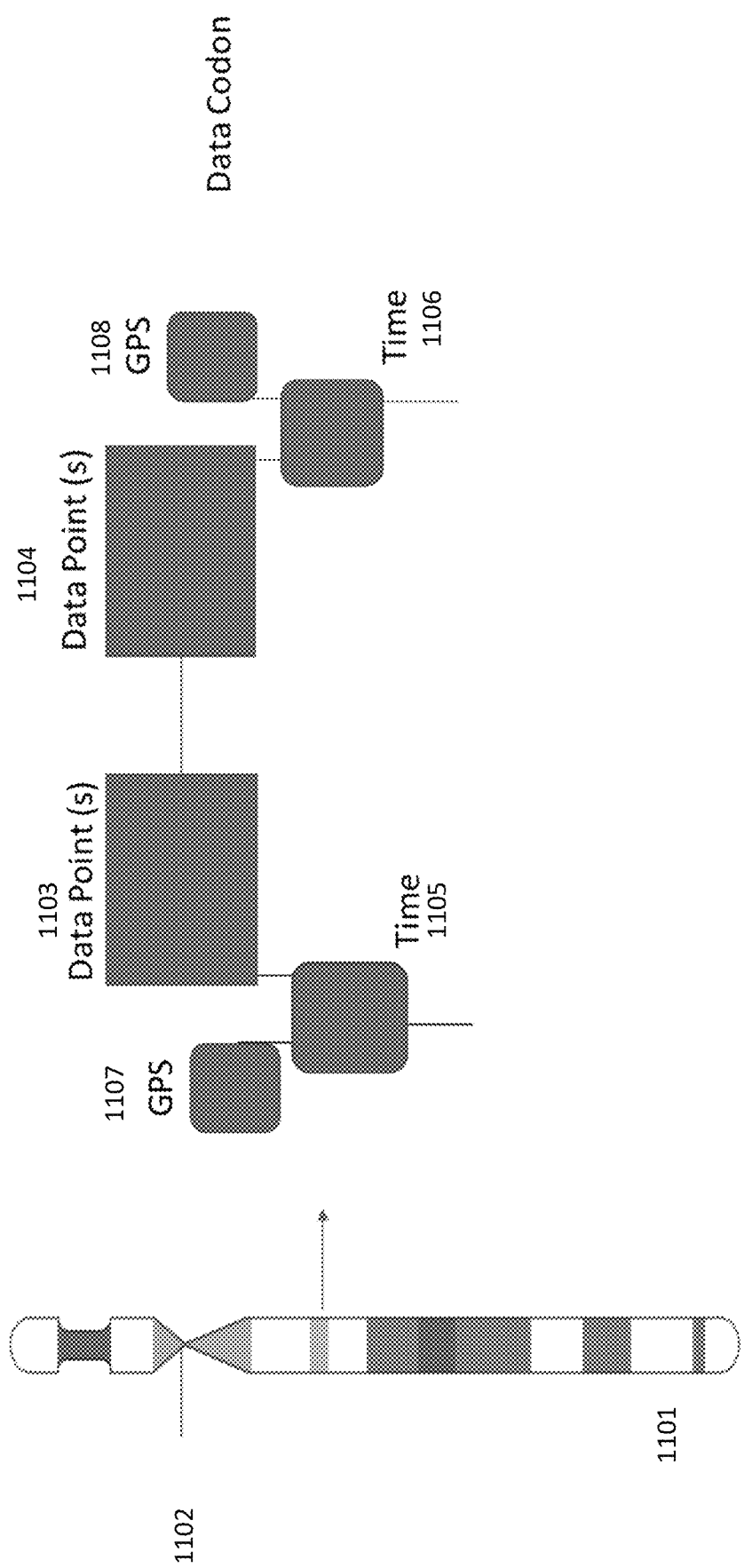
FIG. 11 shows a codon, the basic structure of a datasome, and the construction of a codon.

FIG. 11 shows a codon, the basic structure of a datasome, and the construction of a codon. The codon is made of co-localized and co-registered general and specific data points relevant to the datasome in question. General data points may include but are not limited to time (date: year, month, day, timestamp: hour, minute, seconds, milliseconds), GPS location (longitude, latitude and height or altitude), Device ID, and so forth. Specific data points for a health datasome (HD) include vital signs, symptoms, medications, lab tests, radiology tests, and so forth, expressed in a known manner, such as an alphanumeric manner. The system can co-register or co-localize data among specific and/or general data points. An example of this is to collocate two examinations, or two sets of examination results, or two sets of attributes such as results of a medical examination collocated with a fashion preference.

The system can also perform a morphing of datasomes, generally a processing that alters the datasome when being applied to the distributed ledger system or blockchain. In one instance, a shape can be provided making the datasome easier to identify, wherein the system applies three dimensional or two dimensional morphing of the datasomes into or using shapes, figures or other demarcating features to securitize the data blocks created on the datasome and/or facilitate retrieval of anonymized data by one with access to the the user or third party. One example of morphing shown in FIG. 11 is to provide the data in an "hourglass" shape, associating in this case fashion data with a specific locus on a health datasome, providing additional securitization of the anonymized data, or to make it easier for the user or a third party to identify and/or retrieve the anonymized data. In this example, the hourglass shape indicates to a viewer that the information, anonymized, is associated with a healthcare entry combined with a fashion entry. Another example of morphing would be to combine the data with a visual representation, such as a visual representation of broccoli, relating intentionally to a data locus on the health datasome where the user took his blood pressure measurement and blood pressure medication and a third party, such as a pharmaceutical company, is interested in the relationship of broccoli to a blood pressure medicine in question and employed by the patient.

The right side of FIG. 11 shows the general assembly and morphing of information. Couple this with genetic or DNA processing, wherein the underlying data is imposed on a genetic or DNA chromosome, such that the result is something like GCTATTGCT etc., and the result is an increase in security. FIG. 11 shows on the left a 3D morphed health datasome 1101 that may be put on a distributed ledger system and that may be viewed by parties having access, wherein point 1102 is a fashion morphing indication that provides an "hourglass" appearance and shape to the underling data. A party reviewing may be able to understand that an hourglass shape of this type means healthcare data morphed with fashion data. Colors, visual representations, different shapes, and so forth may represent different underlying data. FIG. 11 on the right shows a healthcare data point 1103, a time 1105, and a GPS location 1107, and this may be augmented with additional or different data, e.g. device ID, etc. On the right side is a fashion data point or may be any other information, including a second healthcare datapoint taken at a different time, even in the same visit. The two may be combined together, the information coded and genetically or DNA mapped, and provided to the distributed ledger. Data point or points 1104 may be provided with time 1106 and GPS location 1108, wherein the combined information forms a data codon.

Figure 12:
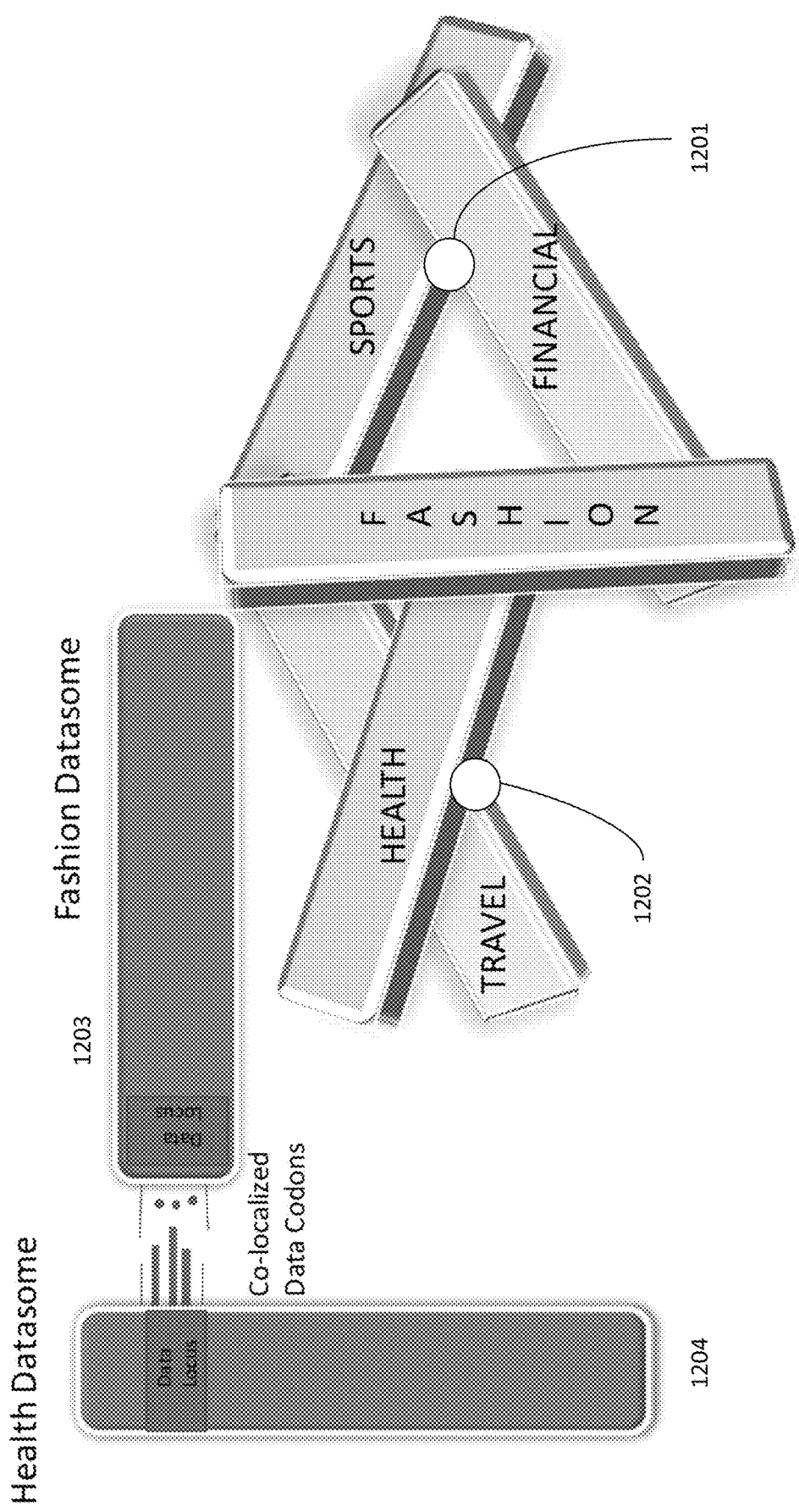
FIG. 12 shows relationships between datasomes and parts of datasomes conceptually.

FIG. 12 is a generalized representation of the intersection between various concepts used to determine datasomes. On the right, point 1201 represents the intersection between sports and financial, such that a datasome may contain sports and financial information, while point 1202 represents an intersection between health and travel. The combined information can serve to further securitize the underlying information. The left side of FIG. 12 shows a fashion datasome 1203 with three points being co-localized, such as is shown on the right side of FIG. 11, where the co-localized data codons of the fashion datasome are provided to the health datasome 1204. This provides combined data, again having an enhanced tendency to limit security breaches.

Figure 13:
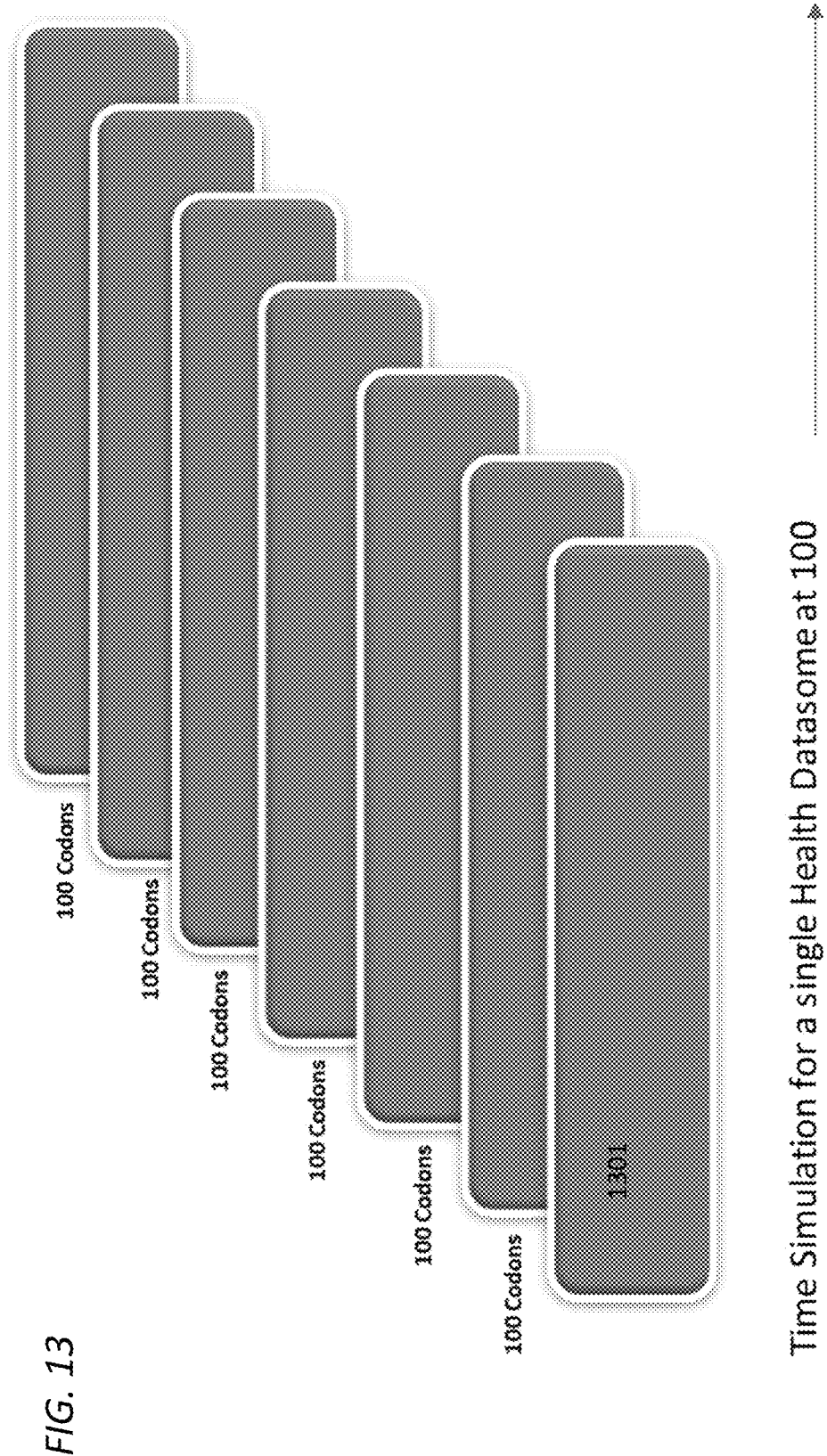
FIG. 13 shows the general concept of prediction, such as by using a generative adversarial network (GAN).

FIG. 13 shows one form of prediction employed by the system. Codons may be formed by the system, representing a prediction, such as a prediction that patient X will have a blood clot based on existing known information about patient X. The system may employ a corrective generative adversarial network (GAN) using deep machine learning and/or quantum computing methodology, in essence two or more neural networks that contest with each other in a game that is corrected and re-calibrated with real world scenarios. Such a generative network may generate candidates that are evaluated using a discriminative network. Codons, or codon groups such as 100 codon group 1301, may be developed by the system, and multiple such codons or codon groups may be developed. When operating a contest, the system operates based on data distributions. Typically, the generative network learns to map from a latent space to a data distribution of interest, while the discriminative network distinguishes candidates produced by the generator from the true data distribution. The generative network's training objective is to increase the error rate of the discriminative network, or in other words, to the GAN produces novel candidates that the discriminator network believes are not synthesized but instead are part of the true data distribution. As an example, in healthcare, the system may conduct a "game" on physiological and pathological virtual twins using anonymized data. The system alters and recalibrates resultant predictions about the virtual twins and generates suggestions to the patient/user and/or provider, and the system may improve predictions over time based on additional data and further processing. For example, if persons exhibiting characteristic X are believed to have an 87% chance of developing condition Y, and data suggests or the network determines the number has decreased to 83%, that number may be provided. Thus according to the present design, a real time prediction model may be provided that computes the probability of formation of a new codon under the assumption of random codon distribution and co-localization, and the system may develop and assess a new codon or codons for purposes of improving predictions.

Thus according to one embodiment of the present design, there is provided a method for anonymizing data for distribution on a distributed ledger arrangement, comprising receiving initial data at a computing device, the initial data relating to an initiating party, removing, at the computing device, personal identifying information from the initial data, thereby creating personal identifying information scrubbed data, anonymizing the personal identifying information scrubbed data on the computing device using DNA processing, thereby creating DNA processed scrubbed data, and providing the DNA processed scrubbed data from the computing device to the distributed ledger arrangement.

According to another embodiment of the present design, there is provided a method for interacting with data using a distributed ledger arrangement, comprising receiving initial data at a computing device relating to an initiating party, the initial data relating to an initiating party, removing, at the computing device, personal identifying information from the initial data, thereby creating personal identifying information scrubbed data, anonymizing the personal identifying information scrubbed data on the computing device using genetic processing, thereby creating genetic processed scrubbed data, and providing the genetic processed scrubbed data from the computing device to the distributed ledger arrangement.

According to a further embodiment of the present design, there is provided a method for interacting with data using a distributed ledger arrangement, comprising receiving initial data at a computing device relating to an initiating party, the initial data relating to an initiating party, removing, at the computing device, personal identifying information from the initial data, thereby creating personal identifying information scrubbed data, anonymizing the personal identifying information scrubbed data on the computing device using DNA processing, thereby creating DNA processed scrubbed data, and providing the DNA processed scrubbed data from the computing device to the distributed ledger arrangement. Once the DNA processed scrubbed data has been provided to the distributed ledger arrangement, a third party may retrieve the genetic processed scrubbed data from the computing device and deanonymize the genetic processed scrubbed data only when authorized by the initiating party.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for anonymizing data for distribution on a distributed ledger arrangement, comprising:
   receiving initial data at a computing device, the initial data comprising a location indicator and a time associated with an event associated with an individual, as well as event data associated with the event relating;
   removing, at the computing device, personal identifying information from the initial data, thereby creating personal identifying information scrubbed data;
   anonymizing the personal identifying information scrubbed data on the computing device using DNA processing, thereby creating Deoxyribonucleic acid (DNA) processed scrubbed data wherein DNA processing comprises generating a DNA sequence and applying the DNA sequence to the personal identifying information scrubbed data;

producing a codon comprising the DNA processed scrubbed data processed from the location indicator, the time, and the event data; and providing the codon from the computing device to the distributed ledger arrangement.

2. The method of claim 1, wherein the distributed ledger arrangement comprises blockchain.

3. The method of claim 1, wherein the DNA sequence is not the DNA sequence of the individual.

4. The method of claim 1, wherein the anonymizing further comprises morphing the DNA scrubbed data using a visual identifier.

5. The method of claim 4, wherein the visual identifier comprises one of a shape and a picture.

6. The method of claim 1, wherein the initial data comprises one from a group comprising healthcare data, financial data, fashion data, sports data, health data, and travel data.

7. The method of claim 1, wherein anonymizing further comprises combining data from multiple data instances prior to DNA processing.

8. The method of claim 1, wherein anonymizing additionally comprises use of public/private key technology.

9. A method for interacting with data using a distributed ledger arrangement, comprising:

receiving initial data at a computing device, the initial data comprising a location indicator and a time associated with an event associated with an individual, as well as event data associated with the event;

removing, at the computing device, personal identifying information from the initial data, thereby creating personal identifying information scrubbed data;

anonymizing the personal identifying information scrubbed data on the computing device using genetic processing, thereby creating genetic processed scrubbed data wherein genetic processing comprises generating a genetic sequence and applying the genetic sequence to the personal identifying information scrubbed data; and providing the genetic processed scrubbed data processed from the location indicator, the time, and the event data from the computing device to the distributed ledger arrangement.

10. The method of claim 9, further comprising retrieving the genetic processed scrubbed data from the computing device and deanonymizing the genetic processed scrubbed data only when authorized.

11. The method of claim 10, wherein the initial data is augmented with contact information of the individual.

12. The method of claim 10, wherein deanonymizing requires genetic information associated with the individual.

13. The method of claim 9, further comprising predicting using an artificial intelligence agent and at least one of deep machine learning methodology and quantum computing methodology using a corrective generative adversarial network (GAN).

14. The method of claim 9, wherein the anonymizing further comprises morphing the genetic scrubbed data using a visual identifier.

15. The method of claim 14, wherein the visual identifier comprises one of a shape and a picture.

16. The method of claim 9, wherein the initial data comprises one from a group comprising healthcare data, financial data, fashion data, sports data, health data, and travel data.

17. A method for interacting with data using a distributed ledger arrangement, comprising:

receiving initial data at a computing device, the initial data comprising a location indicator and a time associated with an event associated with an individual, as well as event data associated with the event;

removing, at the computing device, personal identifying information from the initial data, thereby creating personal identifying information scrubbed data;

anonymizing the personal identifying information scrubbed data on the computing device using Deoxyribonucleic acid (DNA) processing, thereby creating DNA processed scrubbed data wherein DNA processing comprises generating a DNA sequence and applying the DNA sequence to the personal identifying information scrubbed data;

providing the DNA processed scrubbed data processed from the location indicator, the time, and the event data from the computing device to the distributed ledger arrangement;

wherein once the DNA processed scrubbed data has been provided to the distributed ledger arrangement, a third party may retrieve the genetic processed scrubbed data from the computing device and deanonymize the genetic processed scrubbed data only when authorized by the initiating party.

18. The method of claim 17, wherein the distributed ledger arrangement comprises blockchain.

19. The method of claim 17, further comprising using a quantum computing agent to perform an arithmetic shift on the genetic processed scrubbed data on the distributed ledger arrangement.

* * * * *